United States Patent
Kamitani

[11] Patent Number: 5,969,444
[45] Date of Patent: Oct. 19, 1999

[54] STEPPING MOTOR AND TAKING LENS BARREL FOR CAMERA INCORPORATING SAID STEPPING MOTOR

[75] Inventor: Masatoshi Kamitani, Tondabayashi, Japan

[73] Assignee: Minolta Co., Ltd., Osaka, Japan

[21] Appl. No.: 09/066,959

[22] Filed: Apr. 28, 1998

[30] Foreign Application Priority Data

Apr. 28, 1997 [JP] Japan .................................. 9-110934

[51] Int. Cl.$^6$ .......................... H02K 37/12; H02K 37/04; G03B 9/20; G03B 9/08
[52] U.S. Cl. ..................... 310/49 R; 310/162; 310/164; 310/193; 310/254; 396/463; 396/469; 396/471; 396/508
[58] Field of Search .................... 310/49 R, 162, 310/163, 164, 165, 216, 193, 258, 259, 254; 396/213, 458, 462, 463, 469, 508, 471

[56] References Cited

U.S. PATENT DOCUMENTS

| | | | |
|---|---|---|---|
| 3,786,291 | 1/1974 | Sidell | 310/162 |
| 4,629,924 | 12/1986 | Grosjean | 310/257 |
| 4,782,353 | 11/1988 | Ogihara et al. | 354/234.1 |
| 4,897,681 | 1/1990 | Yamamoto et al. | 354/271.1 |
| 4,952,859 | 8/1990 | Torisawa et al. | 318/696 |
| 5,117,137 | 5/1992 | Kobayashi | 310/49 R |
| 5,117,251 | 5/1992 | Ishimura et al. | 354/400 |
| 5,384,506 | 1/1995 | Aoshima | 310/49 R |
| 5,418,588 | 5/1995 | Chigira | 354/234.1 |

FOREIGN PATENT DOCUMENTS 1-101527  4/1989  Japan .

*Primary Examiner*—Clayton E LaBalle
*Assistant Examiner*—Tran N Nguyen
*Attorney, Agent, or Firm*—Burns, Doane, Swecker & Mathis, LLP

[57] ABSTRACT

A stepping motor is equipped with a rotor, a supporting member that rotatably support the rotor, and stators that have multiple stator teeth and that face each other across the diameter of the rotor, wherein said multiple stator teeth are positioned such that they are apart from each other. Using the construction described above, it is possible to make the rotor diameter smaller than the conventional model, thereby reducing the overall size of the stepping motor. Therefore, it is possible to make the outer diameter of lens barrel smaller than the conventional model without changing the lens diameter, which in turn makes the overall size of the camera more compact.

27 Claims, 5 Drawing Sheets

STEPPING MOTOR AND TAKING LENS BARREL FOR CAMERA INCORPORATING SAID STEPPING MOTOR

This application is based on application No. 9-110934 filed in Japan, the contents of which is hereby incorporated by reference.

BACKGROUND OF THE INVENTION

1. Field of the Invention

The present invention pertains to a stepping motor and to a taking lens barrel for a camera incorporating said stepping motor as a drive source for the shutter mechanisms or diaphragm mechanisms.

2. Description of the Related Art

Conventionally, one major aspect of the desire for increased camera compactness has been the trend toward increasingly compact lens barrel units. For example, as shown in FIG. 9, stepping motor 86 is used as an actuator to rotate rotatable ring 84 that opens and closes diaphragm blades 82 placed inside lens barrel unit 80 (see, e.g., Japanese Laid-Open Patent Application Hei 1-101527). An example of another conventional lens barrel unit having fewer parts than the conventional stepping motor 86 described above is shown in FIG. 7, which shows the construction and arrangement of the mechanism of stepping motor 51 inside conventional lens barrel unit 50, and FIG. 8 shows a cross-section of the mechanism in FIG. 7 cut along the VIII—VIII line. Stepping motor 51 comprises (i) essentially cylindrical rotor 53 (which is polarized to have multiple polarities along its circumference) that is rotatably supported by supporting members 52 fixed inside lens barrel 50, and (ii) horseshoe-shaped stators 54 that face each other across rotor 53. Because stepping motor 51 is placed at a position that is outside and around lens 55 so as not to hinder the image recording operation, reducing the size of lens barrel unit 50 without changing the diameter of lens 55 depends on how the size of stepping motor 51 is reduced.

The example of FIG. 7 is an example in which space is used more efficiently by curving yokes 56 of horseshoe-shaped stators 54 into arches along the circumference of lens barrel 50. In order to further reduce the size of the stepping motor, it is necessary to reduce the diameter of rotor 53 and to reduce the gaps between stator teeth 56a and 56b of yokes 56. However, that would entail the problem that the pressing of yokes 56 would become difficult and the manufacturing cost would increase. In addition, when the need for preserving the space for the winding of coils 57 is taken into account, the gaps between stator teeth 56a and 56b of yokes 56 cannot be reduced beyond a certain degree. It is therefore concluded that only limited compactness can be achieved if the construction described above is used.

Consequently, the technological problem to be resolved by the present invention is to reduce the size of the stepping motor through a creative configuration of the yokes and to reduce the size of the camera lens barrel through the use of said reduced-size stepping motor.

SUMMARY OF THE INVENTION

In order to resolve the problem described above, the stepping motor pertaining to the present invention is equipped with a rotor that has an essentially cylindrical configuration and is polarized along its circumference, a supporting member that rotatably support the rotor, and stators that have multiple stator teeth and that face each other across the diameter of the rotor, wherein said multiple stator teeth are positioned such that they are apart from each other along the circumference and axis of said rotor, or in other words, wherein the stator teeth of the yokes are positioned such that they are apart from each other not only along the circumference of the rotor but also along the axis of the rotor.

Said stepping motor is used for the stepping motor positioned outside and around the lens in a taking lens barrel for a camera.

Said stepping motor is also used for the drive source for the elements which compose a camera.

As variations of the construction of the yokes, one in which first and second stator teeth extend parallel to each other along the axis of the rotor, one in which the first stator tooth extends along the axis of the rotor and the second stator tooth extends along the circumference of the rotor, and one in which the first and second stator teeth extend parallel to each other along the circumference of the rotor are available.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Embodiments of the stepping motor pertaining to the present invention and of a taking lens barrel for a camera incorporating said stepping motor are explained in detail below with reference to FIGS. 1 through 6.

Figure 1:
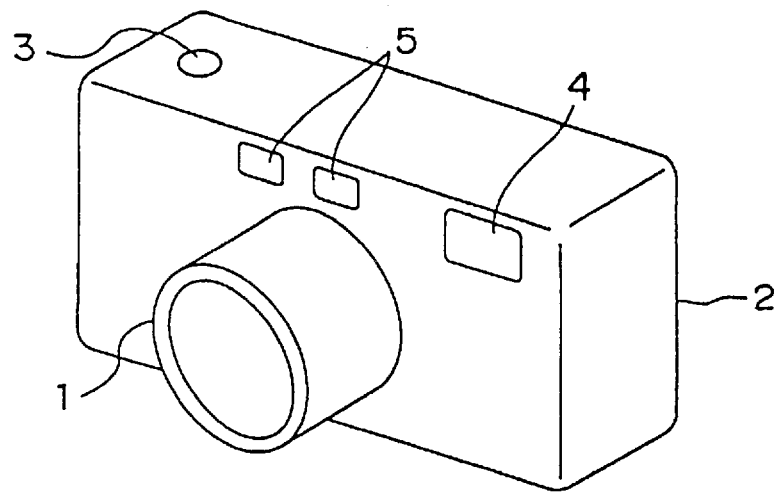
FIG. 1 is a perspective view showing the external view of a camera equipped with the lens barrel pertaining to the present invention.

FIG. 1 is a perspective view showing the external view of a camera. This camera is a lens shutter camera. 1 is a lens barrel, 2 is a camera body, 3 is a shutter release button, 4 is a finder objective window and 5 is distance measurement windows.

Figure 2:
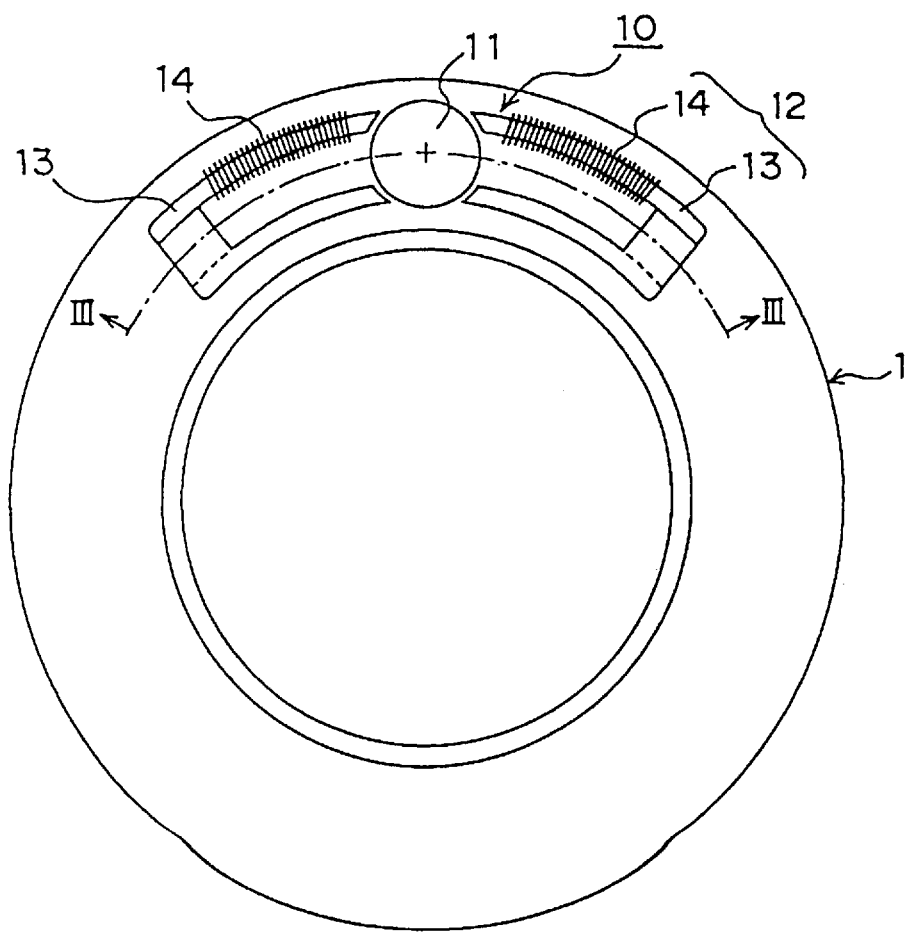
FIG. 2 is a front elevation showing the construction of the stepping motor placed inside the lens barrel of the camera shown in FIG. 1.
Figure 3:
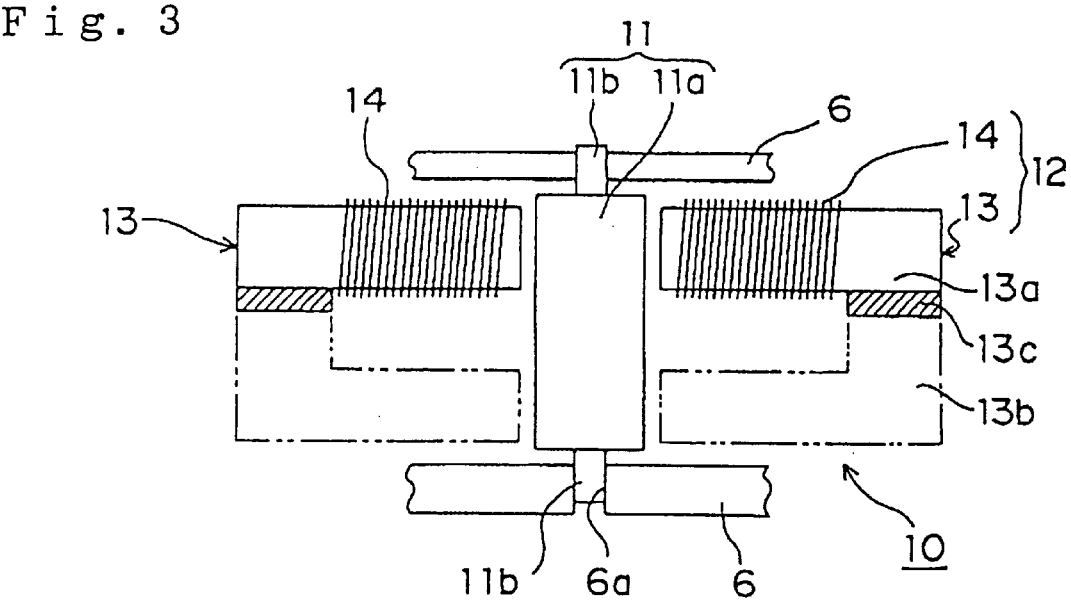
FIG. 3 is a cross-sectional view of FIG. 2 cut along the III—III line.
Figure 4:
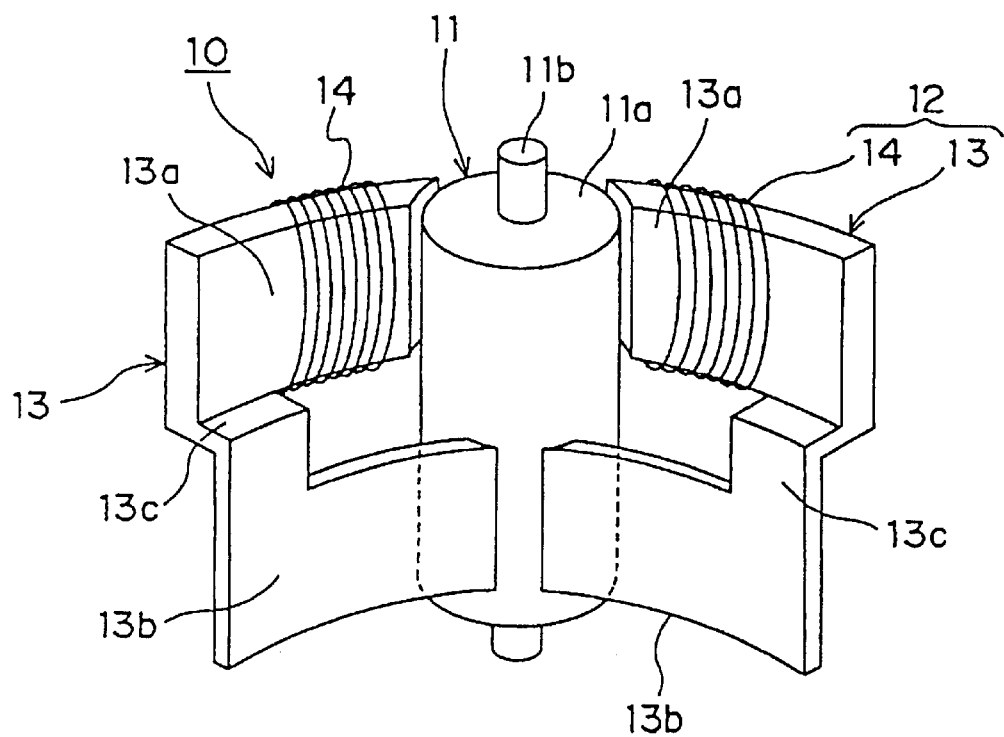
FIG. 4 is a perspective view of the stepping motor shown in FIGS. 2 and 3.

FIG. 2 is a front elevation showing the construction of stepping motor 10 placed inside lens barrel 1. FIG. 3 is a cross-sectional view of FIG. 2 cut along the III—III line. FIG. 4 is a perspective view of stepping motor 10. In the drawings, 11 is a rotor having essentially a cylindrical configuration, and comprises main body 11a that is polarized along its circumference and small-diameter supporting members 11b attached to either end of the axis of main body 11a. Supporting members 11b are rotatably supported by bearing holes 6a of supporting members 6 placed inside lens barrel 1. Although this is not shown in the drawings, rotor 11 is linked with the shutter mechanism, diaphragm mechanism and lens drive mechanism via a drive transmission mechanism, so that these mechanisms are driven by rotation of rotor 11.

Each stator 12 comprises 13 and coil 14 wound around yoke 13, and the two yokes 13 are formed so as to be located in a symmetrical fashion across rotor 11. Each yoke 13 is made by press-bending a thin plate, and is equipped with two parallel stator teeth 13a and 13b and connecting member 13c that connects stator teeth 13a and 13b. In each yoke 13, stator teeth 13a and 13b are positioned along the circumference of rotor 11 such that they are angled essentially 90° from each other. Stator teeth 13a and 13b of yokes 13 are also positioned apart from each other along the axis of rotor 11, such that sufficient space is preserved for coil 14 to be wound around stator teeth 13a.

In the construction described above, when coils 14 are alternately excited, rotor 11 rotates as the magnetic flux formed by stators 12 changes, thereby driving the shutter and diaphragm mechanisms.

On the other hand, using the construction described above, because stator teeth 13a and 13b are positioned apart from each other not only along the circumference but also along the axis of rotor 11 so that there is sufficient space for the winding of coil 14, it is possible to make the rotor diameter smaller than the conventional model and to reduce the gap between stator teeth 13a and 13b along the circumference of the rotor, thereby reducing the overall size of stepping motor 10. Therefore, it is possible to make the outer diameter of lens barrel 1 smaller than the conventional model without changing the lens diameter, which in turn makes the overall size of the camera more compact.

In addition, because stator teeth 13a and 13b are positioned apart from each other along the circumference and the axis of rotor 1, even if stepping motor 10 is reduced in size along the lens diameter, sufficient space is preserved between stator teeth 13a and 13b. Consequently, yokes 13 can be easily manufactured using the pressing technique and the manufacturing cost can be kept down.

Figure 9:
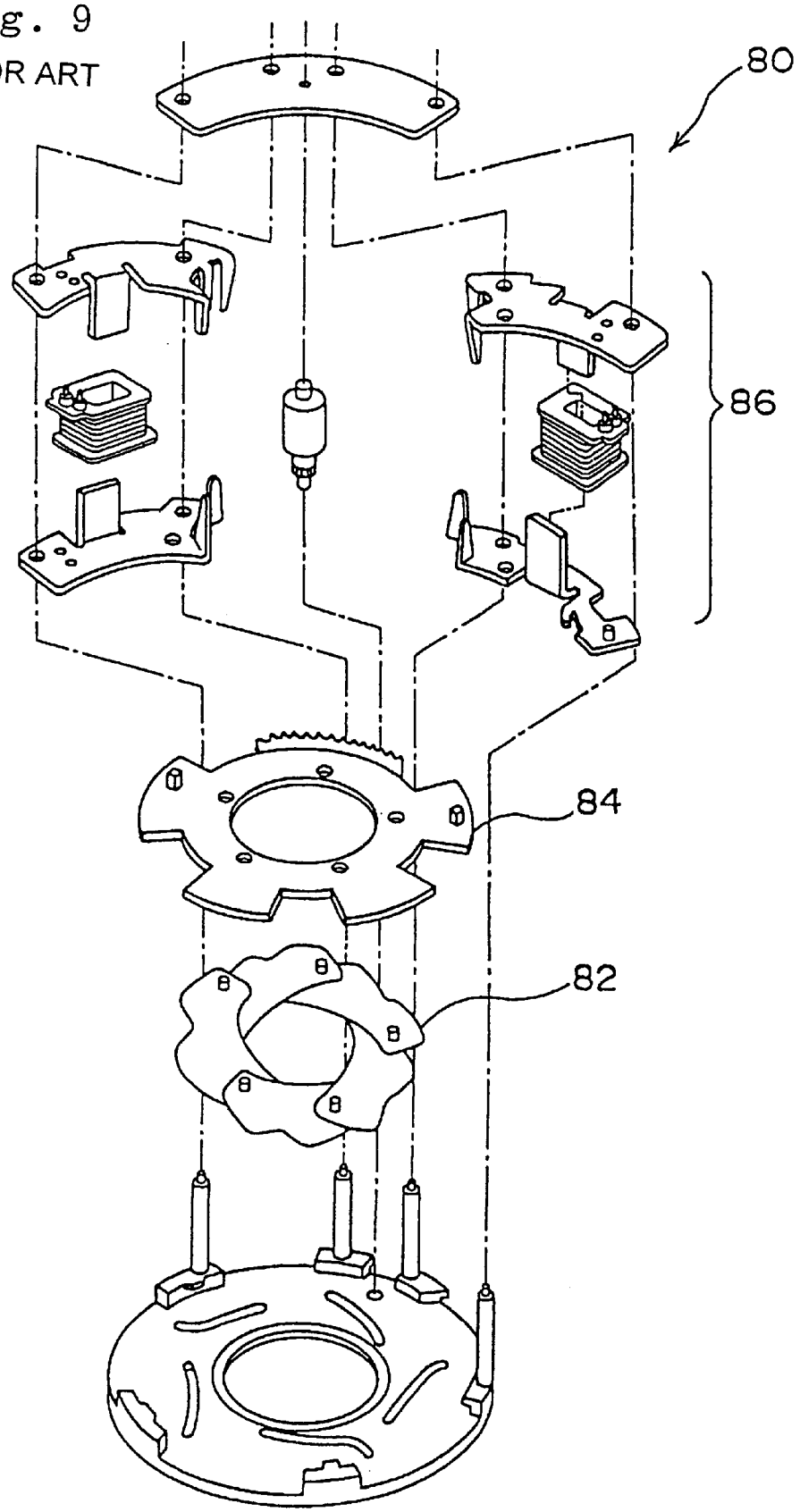
FIG. 9 is an exploded perspective view showing the location of the stepping motor in the conventional lens barrel unit.

With the construction of the stepping motor of this embodiment described above, the lens barrel unit in which the stepping motor of the present invention is used is constructed in the same manner as the lens barrel shown in FIG. 9, with the stepping motor of the present invention being replaced by stepping motor 86.

In this case, even if the lens diameter stays the same, the size of the lens barrel can be reduced along the lens diameter.

Figure 5:
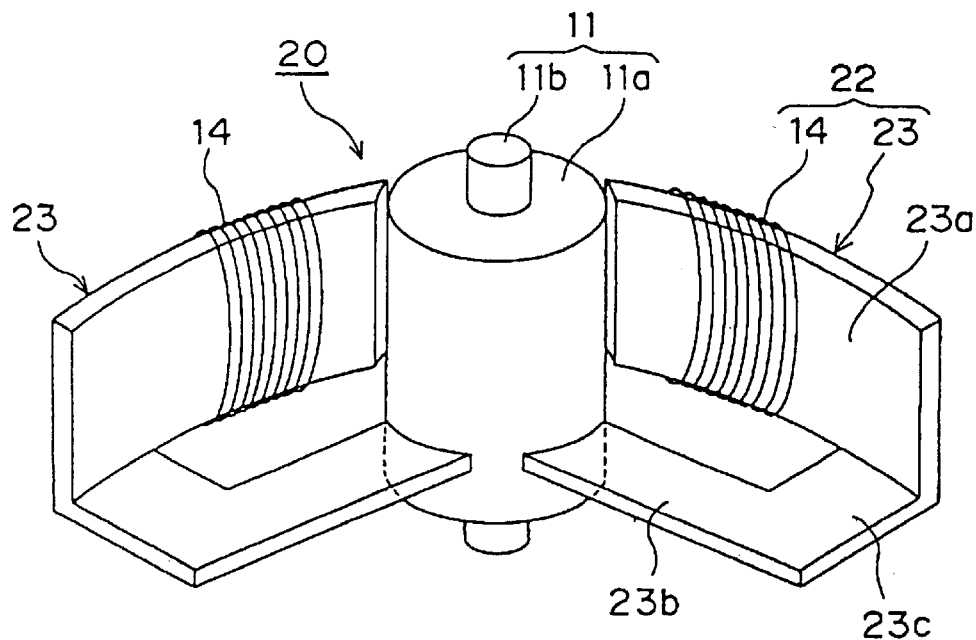
FIG. 5 is a perspective view showing a first variation of the stepping motor shown in FIG. 4.
Figure 6:
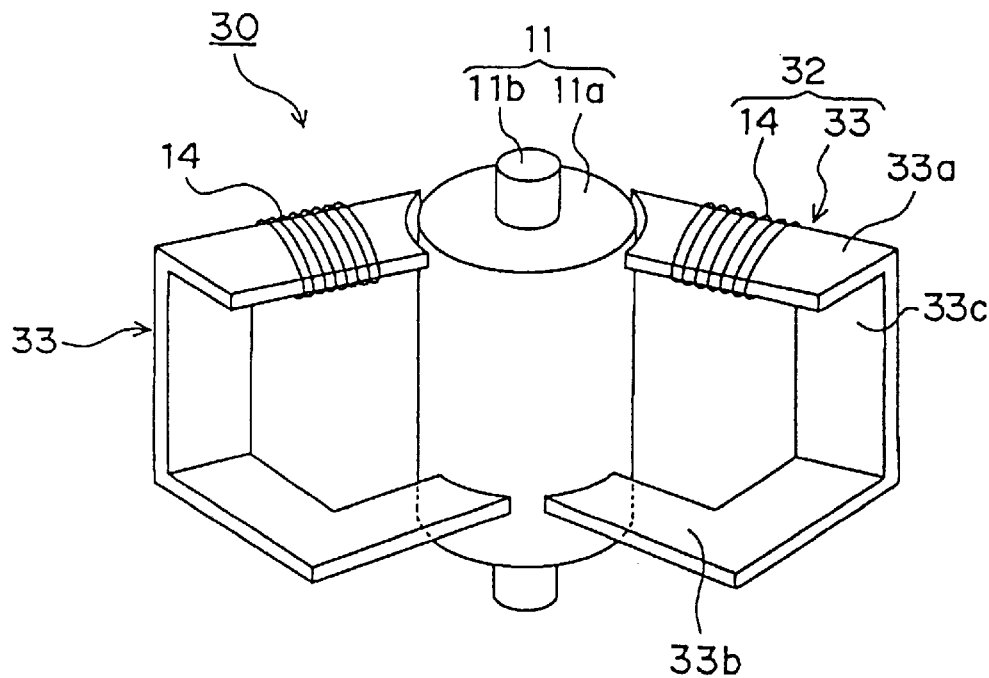
FIG. 6 is a perspective view showing a second variation of the stepping motor shown in FIG. 4.
Figure 7:
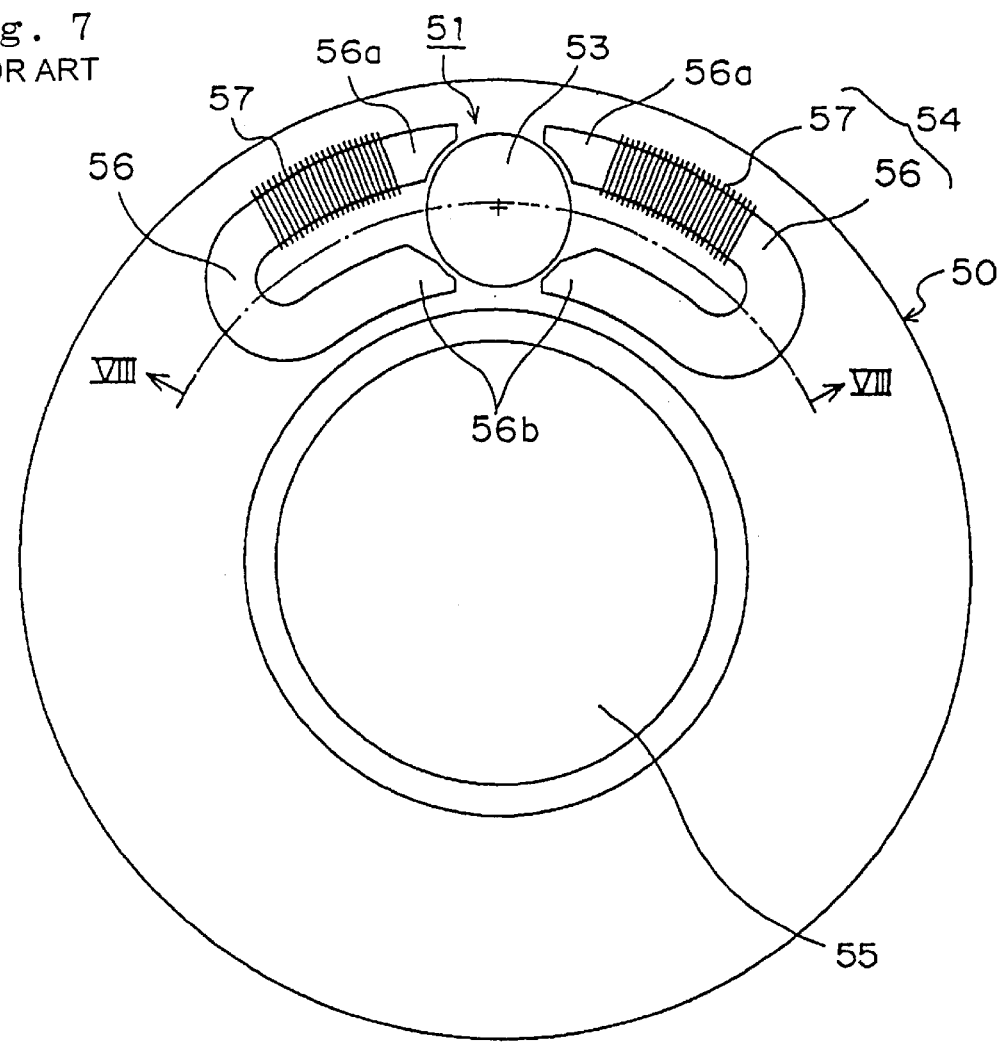
FIG. 7 is a front elevation showing the location of the stepping motor in a conventional lens barrel unit.
Figure 8:
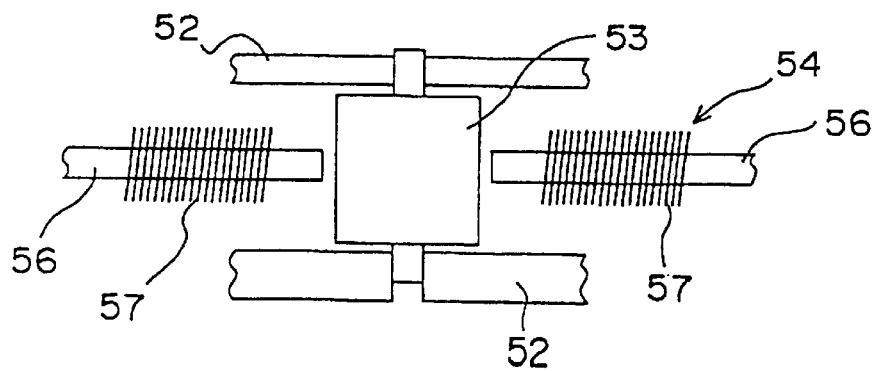
FIG. 8 is a cross-sectional view of FIG. 7 cut along the VIII—VIII line.

FIGS. 5 and 6 are perspective views showing variations 20 and 30 of the stepping motor. In each variation, rotor 11 and coils 14 have the same construction as in the embodiment described above, and therefore their explanation will be omitted. Yokes 23 and 33 of stators 22 and 32, respectively, are formed of thin plates using the same pressing technique as in the previous embodiment.

Yoke 23 shown in FIG. 5 has a construction in which stator teeth 23a and 23b are linked with each other by linking member 23c such that they are located at right angles relative to each other. Stator tooth 23a is positioned such that it extends along the axis of rotor 11, while stator tooth 23b extends along the circumference of rotor 11. Yoke 33 shown in FIG. 6 has stator teeth 33a and 33b that are parallel to each other but are positioned apart from each other along the circumference and axis of rotor 11, as well as linking member 33c that links said stator teeth. Stator teeth 33a and 33b are positioned such that they extend along the circumference of rotor 11.

In the example of FIG. 5, stator tooth 23b of each yoke 23 is positioned such that it extends along the circumference of rotor 11, and in the example of FIG. 6, stator teeth 33a and 33b of each yoke 33 are positioned such that they extend along the circumference of rotor 11. Consequently, when they are compared with the example of FIG. 4 in which both stator teeth 13a and 13b are positioned such that they extend along the axis of rotor 11, the rotor has a slightly larger diameter. However, in comparison with the conventional stepping motor, the diameter of rotor 11 may be reduced while maintaining the space for coil 14, so as to reduce the diameter of the stepping motor and the size of the lens barrel and camera.

The present invention is not limited to the embodiments described above, and may be implemented in various other forms. For example, while in the embodiments described above yokes 13, 23 and 33 are made by pressing thin plates, they may be made via welding. In addition, the stator teeth may have a rod-like or other configuration instead of a plate configuration. Further, while explanations were provided in connection with the embodiments described above with regard to a stepping motor that works as a drive source to drive the shutter and diaphragm mechanisms of a lens shutter camera, the stepping motor of the present invention may be used as a drive source for auto-focusing in a single lens reflex camera lens barrel, or it may be constructed as an independent general-purpose motor comprising a rotor and stators placed in a housing.

Using the constructions shown in FIGS. 4 through 6, since the stator teeth are positioned apart from each other not only along the circumference but also along the axis of the rotor, space for the coil can be preserved even if the rotor diameter is reduced and the gap between the stator teeth along the circumference of the rotor is reduced, even as the stepping motor is reduced in overall size. In addition, since the gap between the stator teeth is not reduced when the overall size of the stepping motor is reduced, due to the fact that the stator teeth are positioned apart from each other along the circumference and axis of the rotor, the stators can be easily made using the pressing technique and the manufacturing cost can be kept down.

Further, if the stepping motor having the construction described above is placed outside and around the lens inside an taking lens barrel for a camera, the outer diameter of the lens barrel can be made smaller than that of the conventional model without changing the lens diameter, which in turn makes it possible to reduce the overall size of the camera.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A stepping motor comprising:
   a rotor having an essentially cylindrical configuration, a longitudinal axis, and a circumference, said rotor being polarized along the circumference;

a supporting member which rotatably supports said rotor; and at least a first stator and a second stator each having at least a first tooth and a second tooth, said first stator and said second stator substantially facing each other across said rotor, wherein said first tooth of said first stator and said second tooth of said first stator are located in different positions along the circumference of said rotor, and said first tooth of said first stator and said second tooth of said first stator are located in different positions along the longitudinal axis of said rotor.

2. A stepping motor as claimed in claim 1, wherein the first tooth and the second tooth of said first stator extend parallel to each other along the longitudinal axis of said rotor.

3. A stepping motor as claimed in claim 1, wherein the first tooth of the first stator extends along the longitudinal axis of said rotor and the second stator tooth of the first stator extends along the circumference of said rotor.

4. A stepping motor as claimed in claim 1, wherein the first tooth of the first stator and the second tooth of the first stator extend parallel to each other along the circumference of said rotor.

5. A stepping motor as claimed in claim 1, wherein said first tooth of said first stator and said second tooth of said first stator are located in different positions along the circumference of said rotor by essentially 90°.

6. A stepping motor as claimed in claim 1, wherein said first tooth of said second stator and said second tooth of said second stator are located in different positions along the circumference of said rotor, and said first tooth of said second stator and said second tooth of said second stator are located in different positions along the longitudinal axis of said rotor.

7. A stepping motor as claimed in claim 1, wherein said first stator includes a yoke having said first tooth and said second tooth of said first stator.

8. A taking lens barrel for a camera, comprising:

a stepping motor positioned outside and at least partially around a lens, said stepping motor including:

a rotor having an essentially cylindrical configuration, a longitudinal axis, and a circumference, said rotor being polarized along the circumference, a supporting member which rotatably supports said rotor, and at least a first stator and a second stator each having at least a first tooth and a second tooth, said first stator and said second stator substantially facing each other across said rotor, wherein said first tooth of said first stator and said second tooth of said first stator are located in different positions along the circumference of said rotor, and said first tooth of said first stator and said second tooth of said first stator are located in different positions along the longitudinal axis of said rotor.

9. A taking lens barrel as claimed in claim 8, wherein the first tooth and the second tooth of said first stator extend parallel to each other along the longitudinal axis of said rotor.

10. A taking lens barrel as claimed in claim 8, wherein the first tooth of the first stator extends along the longitudinal axis of said rotor and the second stator tooth of the first stator extends along the circumference of said rotor.

11. A taking lens barrel as claimed in claim 8, wherein the first tooth of the first stator and the second tooth of the first stator extend parallel to each other along the circumference of said rotor.

12. A taking lens barrel as claimed in claim 8, wherein said first tooth of said first stator and said second tooth of said first stator are located in different positions along the circumference of said rotor by essentially 90°.

13. A taking lens barrel as claimed in claim 8, wherein said first tooth of said second stator and said second tooth of said second stator are located in different positions along the circumference of said rotor, and said first tooth of said second stator and said second tooth of said second stator are located in different positions along the longitudinal axis of said rotor.

14. A taking lens barrel as claimed in claim 8, wherein said first stator includes a yoke having said first tooth and said second tooth of said first stator.

15. A camera, comprising:

a stepping motor including:

rotor having an essentially cylindrical configuration, a longitudinal axis, and circumference, said rotor being polarized along the circumference, a supporting member which rotatably supports said rotor, and at least one stator having a coil and a yoke, said yoke having at least a first stator tooth and a second stator tooth, wherein the first stator tooth and the second stator tooth are located in different positions along the circumference of the rotor and along the longitudinal axis of the rotor.

16. A camera as claimed in claim 15, wherein the first stator tooth and second stator tooth extend parallel to each other along the longitudinal axis of said rotor.

17. A camera as claimed in claim 15, wherein the first stator tooth extends along the longitudinal axis of said rotor and the second stator tooth extends along the circumference of said rotor.

18. A camera as claimed in claim 15, wherein the first stator tooth and second stator tooth extend parallel to each other along the circumference of said rotor.

19. A camera as claimed in claim 15, further comprising:

a shutter mechanism that is drivable by the rotation of said stepping motor.

20. A camera as claimed in claim 15, further comprising:

a diaphragm mechanism that is drivable by the rotation of said stepping motor.

21. A camera as claimed in claim 15, further comprising:

a lens drive mechanism that is drivable by the rotation of said stepping motor.

22. A stepping motor, comprising:

a substantially cylindrical and polarized rotor having a longitudinal axis and a circumference; and a stator having at least a first tooth and a second tooth, said first tooth located at a first position, said second tooth located at a second position, said first position being spaced from said second position about said circumference of said rotor, said first position being spaced from said second position along said longitudinal axis.

23. The stepping motor of claim 22, wherein said first tooth extends partially along said circumference and said second tooth extends partially along said circumference.

24. The stepping motor of claim 22, wherein said first tooth extends partially along said longitudinal axis, and said second tooth extends partially along said circumference.

25. The stepping motor of claim 22, wherein said first tooth extends partially along said longitudinal axis and said second tooth extends partially along said longitudinal axis.

26. The stepping motor of claim 22, in combination with a camera, said stepping motor for driving at least one of a shutter mechanism, a diaphram mechanism, and a lens drive mechanism of the camera.

27. The stepping motor of claim 22, further comprising a second stator having a first tooth and a second tooth, said first tooth of said second stator being located at a third position, said second tooth of said second stator being located at a fourth position, said third and fourth positions being spaced from said first and second positions, and said third position being spaced from said fourth position about said circumference of said rotor, said third position being spaced from said fourth position along said longitudinal axis.

* * * * *